Feb. 12, 1935.     C. J. WERNER     1,991,041
SYSTEM OF MOTOR CONTROL
Filed March 22, 1933     2 Sheets-Sheet 1

INVENTOR
Calvin J. Werner
BY
ATTORNEYS

Feb. 12, 1935.  C. J. WERNER  1,991,041
SYSTEM OF MOTOR CONTROL
Filed March 22, 1933  2 Sheets-Sheet 2

INVENTOR
Calvin J. Werner
BY
his ATTORNEY

Patented Feb. 12, 1935

1,991,041

UNITED STATES PATENT OFFICE 1,991,041

SYSTEM OF MOTOR CONTROL

Calvin J. Werner, Dayton, Ohio, assignor, by mesne assignments, to General Motors Corporation, Detroit, Mich., a corporation of Delaware Application March 22, 1933, Serial No. 662,030

4 Claims. (Cl. 172—279)

This invention relates to alternating current motors and more particularly to a system of starting and controlling single phase alternating current motors.

An object of this invention is to provide a reliable and durable control system for single phase alternating current motors.

Another object of this invention is to provide an electrically operated control system for controlling the starting and running circuits of single phase alternating current motors.

Another object of this invention is to provide a control system for single phase alternating current motors that will compensate, within a reasonable range, for variations in line voltage.

Another object of this invention is to provide an electrically controlled system for controlling the starting and running circuits of a transformer condenser type single phase motor.

Further objects and advantages of the present invention will be apparent from the following description, reference being had to the accompanying drawings wherein a preferred embodiment of one form of the present invention is clearly shown.

Figure 1:
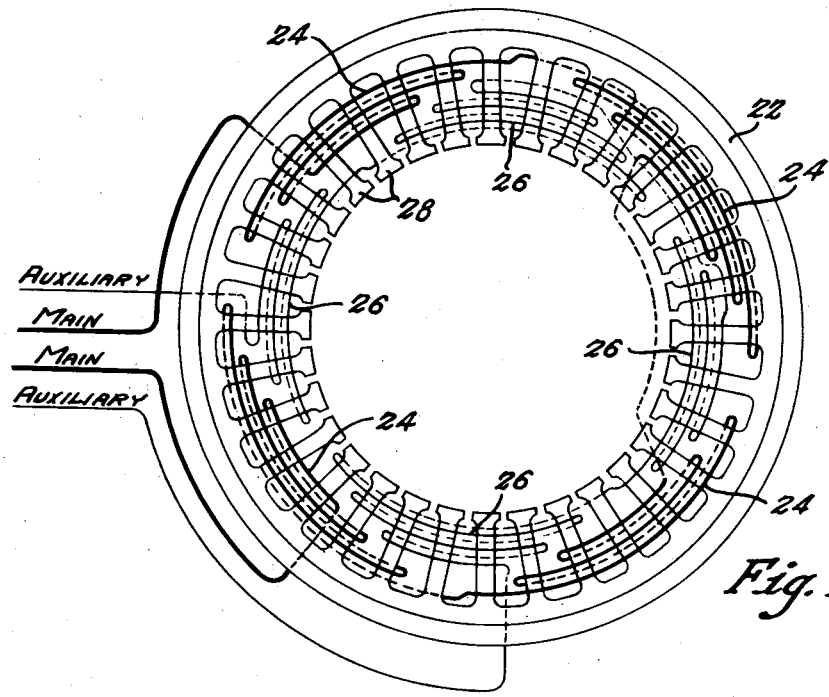
Fig. 1 is a wiring diagram of the stator of a motor adapted to be used in the present invention.
Figure 2:
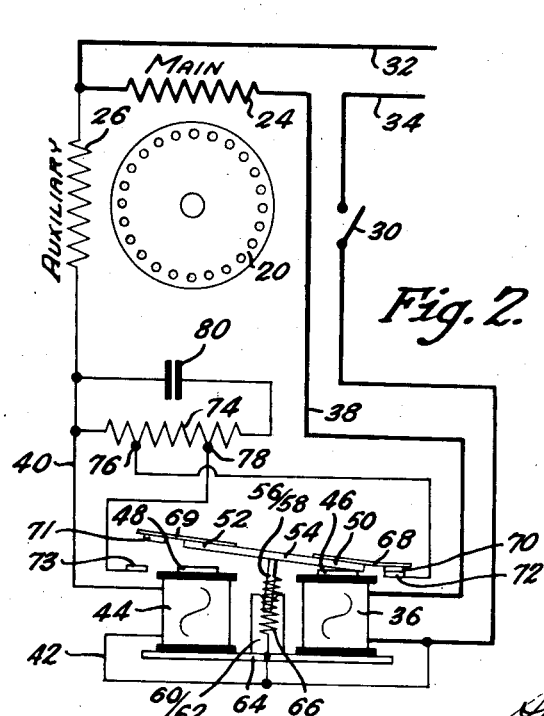
Fig. 2 is a wiring diagram illustrating the circuit connections of a system embodying the present invention.

With particular reference to Figs. 1 and 2, the electric motor comprises a squirrel cage rotor 20 in cooperative relation with a stator 22 having teeth such as 28 upon which a main field winding 24 and an auxiliary field winding 26 are arranged as shown in Fig. 1. A power supply line wire 32 is connected to the main field winding 24 and to the auxiliary field winding 26. Another power supply line wire 34 is connected through a switch 30 to an electromagnet 36 which, in turn, is connected by a wire 38 to the main field winding 24. The power supply line wire 34 is also connected through the switch 30 and a wire 42 to an electromagnet 34 which, in turn, is connected through a wire 40 to the auxiliary field winding 26. The electromagnets 36 and 44 are provided with cores 46 and 48 respectively, which cooperate respectively with lever arms 50 and 52 of a common armature 54, which armature is provided with bifurcated arms 56 and 58 which straddle respectively bifurcated arms 60 and 62 of the base 64, as shown in the diagram. The armature 54 is maintained yieldingly either in a position inclined toward the core 48, or inclined toward the core 46, by a spring 66 connecting the armature 54 with the base 64, and so arranged that its center line of action moves to either side of a vertical plane through the center line of the arms 56, 58, 60 and 62. The armature 54 has contact carrying members 68 and 69 mounted thereon and carrying contacts 70 and 71 respectively, which contacts are alternately engageable with cooperating contacts 72 and 73 respectively. An auto-transformer 74 having taps 76 and 78 on the winding intermediate the extremities thereof, has one end connected to the auxiliary field winding 26 through the wire 40, and its other end is connected to one side of the condenser 80. The other side of the condenser 80 is connected to the auxiliary field winding 26 through the wire 40. A tap 76 is connected to the contact 72, while the tap 78 is connected to the contact 73.

When the power supply line circuit is closed through the switch 30, the electromagnet 36 is energized by virtue of its connections to the power supply line, one being through the main field winding 24. When the electromagnet 36 is thus energized, the arm 50 of the armature 54 is attracted thereby to cause engagement of the contacts 70 and 72. The engagement of these contacts is facilitated and aided by the spring 66 when it crosses the center line of the bifurcated arm to the side toward which the armature is moved. Engagement of the contacts 70 and 72 closes a circuit from the power supply line 34 to the tap 76 of the transformer 74 through the wire 42, bifurcated arms 56, 58, 60 and 62 and the spring 66, armature 54 and contact carrying member 68. The movement of the armature that causes engagement of the contacts 70 and 72 disengages the contacts 71 and 73 to open the circuit between the power supply line wire 34 and the transformer tap 78. Since the tap 76 is closer to the wire 40 than is the tap 78, and considering the portion of the transformer between the tap 76 and the wire 40 as the primary winding when the contacts 70 and 72 are engaged, the ratio of the turns of the primary winding to those of the whole winding is relatively high. Hence, when the contacts 70 and 72 are engaged, a high voltage is impressed upon the condenser 80 and the effective reactance of that condenser is relatively high. Since the circuit between the power supply line wire 34 and the main field winding 24 is formed through the electromagnet 36, and the circuit to the auxiliary field winding 26 is formed through the parallel combination of the transformer 74 and condenser 80 and the electromagnet 44, a phase difference is produced between the currents in the main and auxiliary field windings; that is, the current in the auxiliary field winding 26 will lead that in the main field winding 24 because the capacitive reactance of the condenser 80. The pull of the electromagnet 36 upon the arm 50, together with the urging force of the spring 66 tend to maintain engagement of the contacts 70 and 72. The circuits formed to the main and auxiliary windings 24 and 26 respectively, together with the position of those windings, causes a rotating field to be produced that starts the rotation of the rotor 20.

Figure 3:
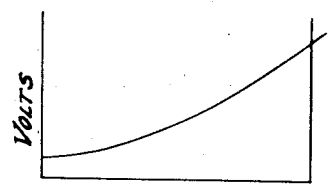
Fig. 3 illustrates by a curve the variation in voltage across an electromagnet winding corresponding to variations in rotor speed.
Figure 4:
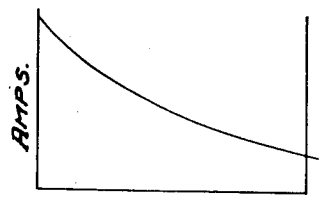
Fig. 4 illustrates by a curve the variation in current through an electromagnet winding corresponding to variations in rotor speed.

As the speed of the rotor increases a counter electromotive force is produced in the main field winding 24 by virtue of the magnetic relation of that winding with the rotor 20. Since that counter electromotive force increases as the rotor speed increases, the current through the main field winding 24, and consequently that through the electromagnet 36 decreases as shown by the curve in Fig. 4. At the same time, the increases in rotor speed causes an increase in the potential drop across the electromagnet 44 as indicated by the curve in Fig. 3. The electromagnet 44 preferably has a higher impedance winding than the electromagnet 36, and is so designed that when a predetermined rotor speed is reached, the pull of the electromagnet 44 upon the arm 52 is sufficient to overcome the holding force of the electromagnet 36 and the spring 66. The electromagnet 44 then effects movement of the armature 54 to a position inclined toward the core 48 so that the contacts 70 and 72 are disengaged and the contacts 71 and 73 are engaged.

When the circuit through the contacts 71 and 73 is closed, to establish the running circuit, the power supply line wire 34 is thereby connected to the transformer tap 78, whereby the transformer ratio and consequently the voltage impressed upon the condenser 80 is reduced. The effective value of the capacity of the condenser 80 is thereby correspondingly reduced. The reduction of the effective capacity of the condenser 80 decreases the phase difference between the currents of the main and auxiliary field windings caused by the condenser which is no longer necessary because of the out-of-phase transformer and rotational voltages produced in the rotor. After the change takes place, the current through the electromagnet 44 remains sufficiently great to maintain the armature 54 in the latter position to maintain the engagement of the contacts 71 and 73.

Figure 5:
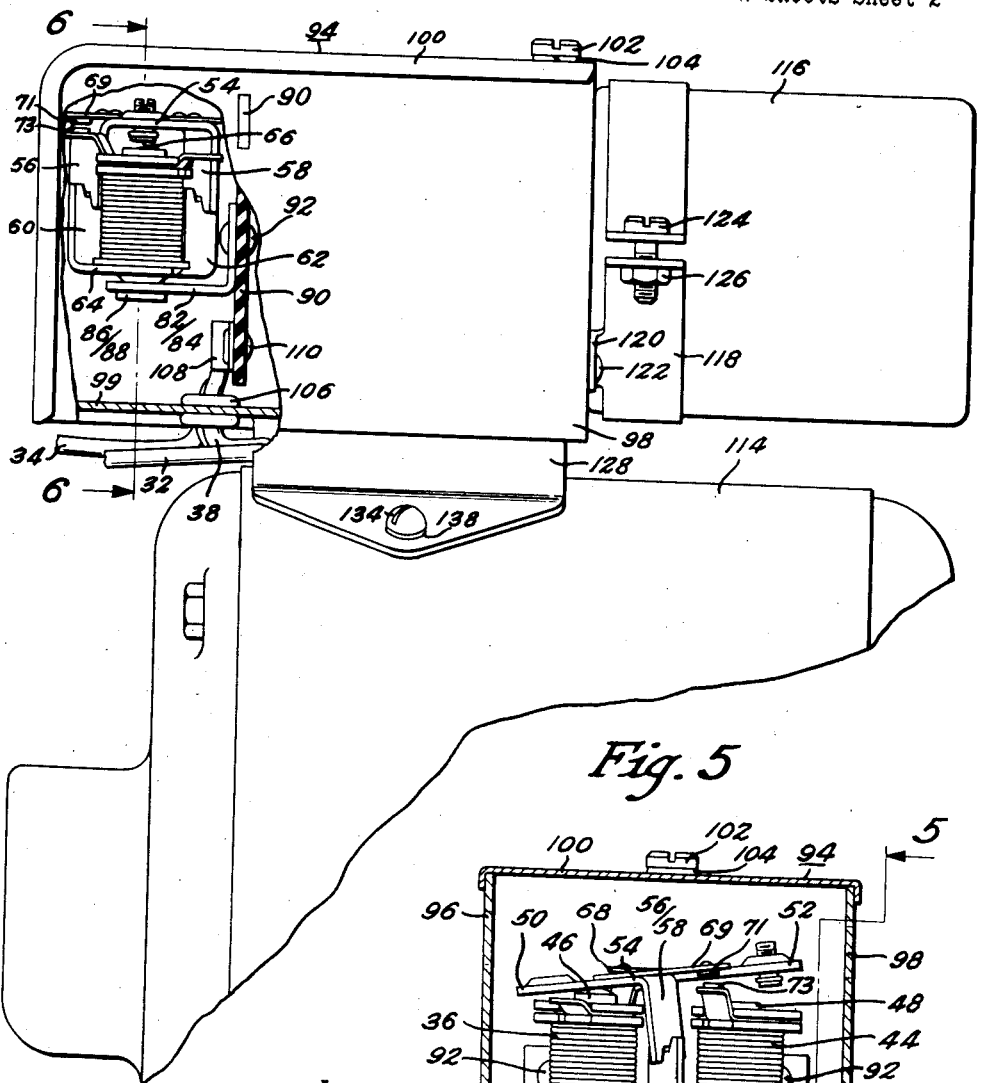
Fig. 5 is a fragmentary elevation of an assembly embodying the present invention, with a part thereof cut away, and looking substantially in the direction indicated by the arrows 5—5 of Fig. 6.
Figure 6:
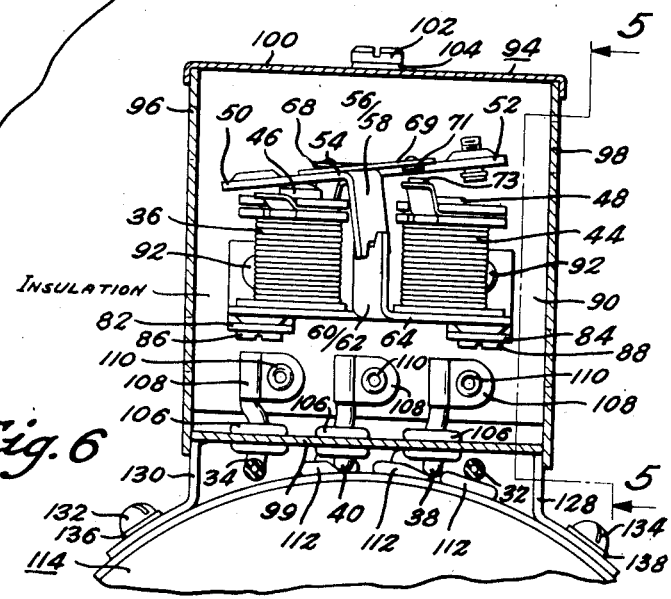
Fig. 6 is a fragmentary sectional view taken substantially on the line 6—6 of Fig. 5, and showing a side view of the electromagnetic switch.

With reference to Figs. 5 and 6, the electromagnetic switch shown, and illustrated diagrammatically in Fig. 2, is the subject of a copending application, Serial No. 642,158, and is explained there in detail. Since the principal elements of the structure, and the operation of this switch have been previously described herein, and similar reference numerals apply to similar parts in Figs. 5 and 6, no further explanation of the details of this switch will be given with reference to the latter figures. The base 64 of the switch is secured to the brackets 82 and 84 by screws or other suitable fastening means 86 and 88 respectively. The brackets 82 and 84 are secured to an insulating mounting piece 90 by rivets or other suitable fastening means 92. A housing 94 having walls such as 96 and 98, a base 99 and a removable cover 100 encloses the switch and the transformer 74. The removable cover 100 is secured to the housing walls by a screw or other suitable fastening means 102 preferably having a lock washer 104. The insulating mounting piece 90 is supported by the walls 96 and 98. The connecting wires 34, 38 and 40 pass through insulating grommets 106 in the base 99, and are preferably anchored to connecting lugs 108 and are secured to the insulating mounting piece 90 by rivets or other suitable fastening means 110. Insulating grommets 112 are provided in a motor frame 114 for the passage of the connecting wires 32, 38 and 40 through the frame to the motor windings. The condenser 116 is secured to one wall of the housing 94 by a band 118 having deformed portions such as 120 that are secured to the housing wall by rivets or other suitable fastening means 122. The condenser 116 is gripped by the band 118 which is tightened therearound by a screw or other suitable fastening means 124 having a cooperating nut 126. The assembly thus formed is fastened to the motor housing 114 by mounting brackets 128 and 130 formed on the base 99 and secured to the motor housing by screws or other suitable fastening means 132 and 134 preferably having lock washers 136 and 138.

When the switch 30 is closed, to close the circuit to the main field winding 24, the electromagnet 36 is energized by virtue of its series connection with the main field winding 24. The electromagnet 36 preferably has a low impedance winding since the main field winding current passes therethrough. The arm 50 of the armature 54 is pulled toward the core 46 when the electromagnet 36 is energized, and the contacts 70 and 72 are engaged to close the starting circuit to the auxiliary field winding 26 through the transformer 74 and the condenser 84. Since the ratio of the transformer 74 is comparatively high when the circuit thereto is formed through the contacts 70 and 72 and the tap 76, the effective reactance of the condenser 80 is comparatively high and the current through the auxiliary field winding 26 leads that through the main field winding 24 by a predetermined amount. By virtue of the position of the main and auxiliary field winding 24 and 26 and the phase different in current therethrough, a rotating field is produced to start the rotation of the rotor 20. There is also a circuit formed to the auxiliary field winding 26 from the power supply line wire 34 through the wire 42 and the electromagnet 44. This circuit through the electromagnet 44 is substantially parallel with the circuit formed through the contacts 70 and 72, transformer 74, and condenser 80. The circuit through the electromagnet 44 preferably has high impedance so that most of the current to the auxiliary field winding 26 flows through the transformer 74 and condenser 80 to provide the proper phase displacement of the current through the auxiliary field winding. Hence, the electromagnet 44 preferably has a high impedance winding to provide the impedance in that circuit.

As the speed of the rotor 20 increases, the current through the electromagnet 44 also increases, and the pull of the electromagnet 44 upon the arm 52 of the armature 54 becomes sufficiently great to actuate the armature to a position inclined toward the core 48 so that the contacts 70 and 72 are disengaged and the contacts 71 and 73 engaged. The circuit from the power supply line wire 34 to the auxiliary field winding 26 is then established through the contacts 71 and 73 and the tap 78. The ratio of the transformer 74 is thereby reduced to effect a reduction in the effective reactance of the condenser 80 to establish the running circuit. The pull of the electromagnet 44 remains sufficiently great to hold the armature 54 in a position inclined toward the core 48 until the rotor speed is sufficiently reduced by an overload or some such abnormal conditions. Since the main field winding and the electromagnet 36 are connected in series, and to the power supply line, the pull of the electromagnet 36 is directly effected by variations in line voltage. And since the electromagnet 44 is connected in series with the auxiliary field winding 26 and to the power supply line, and the current therethrough is affected by the line voltage and rotor speed, the pull of the electromagnet 44 is dependent upon factors including line voltage and rotor speed. The coaction of the electromagnets together with the dependence of the pull of the electromagnets on line voltage, affords a means for compensating, within reasonable limits, for fluctuations or variations in the line voltage.

While the form of embodiment of the present invention as herein disclosed, constitutes a preferred form, it is to be understood that other forms might be adopted, all coming within the scope of the claims which follow.

What is claimed is as follows:

1. A control system for a motor having a rotor and a stator, comprising, in combination, a plurality of field windings having power supply circuits therefor; a starting circuit; a running circuit; and a switch having electromagnets for controlling the starting and running circuits; said starting circuit including a reactance and one of said electromagnets in the power supply circuit of one of the field windings and a second electromagnet in the power supply circuit of the other field winding; said electromagnets effecting change in the effective value of said reactance in response to rotor speed.

2. A control system for a motor having a rotor and a stator, comprising, in combination, a plurality of field windings having power supply circuits therefor; a starting circuit; a running circuit; and a switch having electromagnets for controlling the starting and running circuits; said starting circuit including a reactance and one of said electromagnets connected substantially in parallel, and in the power supply circuit of one of the field windings and a second electromagnet in the power supply circuit of the other field winding; said electromagnets effecting change in the effective value of said reactance in response to rotor speed.

3. A control system for a motor having a rotor and a stator, comprising, in combination, main and auxiliary field windings; a starting circuit including a reactance effectively in series with the auxiliary field winding; a running circuit; a switch for controlling the starting and running circuits; and means for actuating the switch to modify the effective value of said reactance for establishing the running circuit and including an electromagnet connected across the reactance.

4. A control system for a motor having a rotor and a stator, comprising, in combination, a plurality of field windings; a starting circuit; a running circuit; a switch for controlling the starting and running circuits; and electromagnets for actuating the switch, said electromagnets each being connected in series with one of the field windings.

CALVIN J. WERNER.